US012340823B2

United States Patent
Zheng et al.

(10) Patent No.: US 12,340,823 B2
(45) Date of Patent: Jun. 24, 2025

(54) ACCELERATED VIDEO EDITING

(71) Applicant: INTERNATIONAL BUSINESS MACHINES CORPORATION, Armonk, NY (US)

(72) Inventors: Wei Jun Zheng, Shanghai (CN); Jian Jun Wang, Xi'an (CN); Yue Gao, Yorktown Heights, NY (US); Ting Chen, Beijing (CN); Chun Hong Zheng, Beijing (CN); Yin Hu, Ningbo (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 18/325,091

(22) Filed: May 29, 2023

(65) Prior Publication Data

US 2024/0404559 A1    Dec. 5, 2024

(51) Int. Cl.
    *G11B 27/031*      (2006.01)

(52) U.S. Cl.
    CPC .................. *G11B 27/031* (2013.01)

(58) Field of Classification Search
    CPC ........................................... G11B 27/031
    See application file for complete search history.

(56) References Cited

U.S. PATENT DOCUMENTS

| | | | |
|---|---|---|---|
| 6,310,839 B1 | 10/2001 | Lee et al. | |
| 7,280,738 B2 | 10/2007 | Kauffman et al. | |
| 7,362,946 B1 * | 4/2008 | Kowald | H04N 5/76 360/13 |
| 9,172,983 B2 | 10/2015 | Koh et al. | |
| 11,295,783 B2 | 4/2022 | Shen | |
| 2002/0080191 A1 | 6/2002 | Savoie | |
| 2002/0120925 A1 * | 8/2002 | Logan | A61Q 19/00 725/135 |

(Continued)

FOREIGN PATENT DOCUMENTS

| | | |
|---|---|---|
| AU | 2003252878 A1 | 4/2004 |
| CN | 109168084 B | 4/2021 |

(Continued)

OTHER PUBLICATIONS

International Search Report and Written Opinion issued Jun. 24, 2024 in related application No. PCT/IB2024/053412, 11 pgs.

(Continued)

*Primary Examiner* — Mishawn N. Hunter
(74) *Attorney, Agent, or Firm* — Intelletek Law Group, PLLC; Gabriel Daniel, Esq.

(57) ABSTRACT

A method for accelerated video editing that includes providing a video, segmenting, using a segmentation module, the video into a number of clips, and automatically computing, for each clip of the number of clips, corresponding metadata representing at least one attribute of the clip based on an analysis of contents of each clip of the plurality of clips. A profile script is generated based on the corresponding metadata, the profile script is generated to include one or more editing actions to be performed on a section of the video that corresponds to at least one identified clip from the number of clips. An editing tool is used to automatically edit the video based on the profile script to generate an edited video.

20 Claims, 7 Drawing Sheets

(56) References Cited

U.S. PATENT DOCUMENTS

2013/0216206 A1* 8/2013 Dubin .................. G11B 27/031
                                                            386/282
2019/0371023 A1    12/2019  Zhu
2021/0142828 A1*  5/2021  Prakash ............... G11B 27/031

FOREIGN PATENT DOCUMENTS

| CN | 113329259 B | 8/2022 |
| CN | 115481977 A | 12/2022 |
| WO | 2024/246624 A1 | 12/2024 |

OTHER PUBLICATIONS

Feury, D. "How I Completely Automated My YouTube Editing Using FFmpeg", YouTube Video, downloaded Dec. 2, 2023 from, https://www.youtube.com/watch?v=JbX5vDfiyh0&ab_channel=DonaldFeury, 5 pgs.

* cited by examiner

PROFILE SCRIPT 508

Profile specification format:
- <action> [<clip id>]    ← 604
- <option> <option value>    ← 608
- <action> <text>    ← 610
- <option> <option value>

(602, 606, 602 labels)

Profile sample:
remove all clips which type is loading
- cut *
    -type loading
remove all clips which type is loading and attr is <attr-value>
- cut *
    - type loading
    - attr <attr-value>
reduce the duration of clips which type is waiting to 50%
- compress *
    - type waiting
    - rate 0.5
mask the text "this is a confidential message" in image frames
- mask "this is a confidential message"
    - type "image"
mask the audio content "this is a confidential message"
- mask "this is a confidential message"
    - type "audio"
append [clip_2] after [clip_x]
- append [clip_x] after [clip_2]
replace [clip_x] with [clip_y]
- replace [clip_x] with [clip_y]

FIG. 6

ACCELERATED VIDEO EDITING

BACKGROUND

Technical Field

The present disclosure generally relates to accelerated video editing, and more particularly, to intelligently simplifying and accelerating video editing based on a profile script.

Description of the Related Art

Video editing is a highly labor-intensive procedure. Obtaining raw video materials is usually a starting point in the creation of videos. A human then edits the raw video materials at every stage of creating a final video.

To create a production-quality final video, experienced video editors may be employed. This may be labor and time intensive even with the use of high-performance tools and editing software.

BRIEF SUMMARY

According to an embodiment of the present disclosure, a method to accelerate video editing is disclosed. In the method, an original video is provided and segmented, using a segmentation module, into a plurality of clips. For each clip, corresponding metadata is automatically computed to represent at least one attribute of the clip based on an analysis of contents of the clip. A profile script is generated and customized by an operator based on the corresponding metadata. The profile script is generated to include one or more editing actions to be performed on a section of the video that corresponds to at least one identified clip from the plurality of clips. An editing tool is then used to automatically edit the video based on the profile script to generate an edited video. This may accelerate video editing work by automatically processing the clips, via a profile script, that have the same pattern and/or are acted upon by the same type of editing actions.

In one embodiment, the corresponding metadata is generated to be human understandable.

In one embodiment, the editing actions comprise at least one of a cutting action, a compression action, a masking action of a text, image or audio, an appending action, and a replacement action.

According to an embodiment of the present disclosure, a computer program product is disclosed. The computer program product includes one or more computer-readable storage devices and program instructions stored on at least one of the one or more tangible storage devices, the program instructions executable by a processor, the program instructions including program instructions to receive a video and segment the video using a segmentation module, into a plurality of clips. The computer program product also includes program instructions to, for each clip, automatically compute corresponding metadata to represent at least one attribute of the clip based on an analysis of contents of the clip. The computer program product also includes program instructions to enable the generation of and customization by an operator, a profile script. The profile script is generated to include one or more editing actions to be performed on a section of the video that corresponds to at least one identified clip from the plurality of clips. The computer program product also includes program instructions to use an editing tool to automatically edit the video based on the profile script to generate an edited video. This may reduce repeated manual video editing, such as deleting similar patterns of redundant video clips from the original videos and may enable operators to complete video editing more efficiently. For example, playing original videos several times to locate video clips correctly may be alleviated. Therefore, an operator may use their expertise to focus more on video content improvement.

According to an embodiment of the present disclosure, a non-transitory computer-readable storage medium tangibly embodying a computer readable program code is disclosed. The computer readable program code includes computer readable instructions that, when executed, causes a processor to carry out a method that includes receiving an original video and segmented, using a segmentation module, the original into a plurality of clips. For each clip, corresponding metadata is automatically computed to represent at least one attribute of the clip based on an analysis of contents of the clip. The computer readable instructions further cause the processor to enable the generation and customization of a profile script by an operator based on the corresponding metadata. The profile script is generated to include one or more editing actions to be performed on a section of the video that corresponds to at least one identified clip from the plurality of clips. An editing tool is then used to automatically edit the video based on the profile script to generate an edited video. This may accelerate video editing work by reducing repeated manual video editing.

BRIEF DESCRIPTION OF THE DRAWINGS

To easily identify the discussion of any particular element or act, the most significant digit or digits in a reference number refer to the figure number in which that element is first introduced.

FIG. 6 depicts a sketch of a profile script in accordance with an illustrative embodiment.

DETAILED DESCRIPTION

Overview

Figure 1:
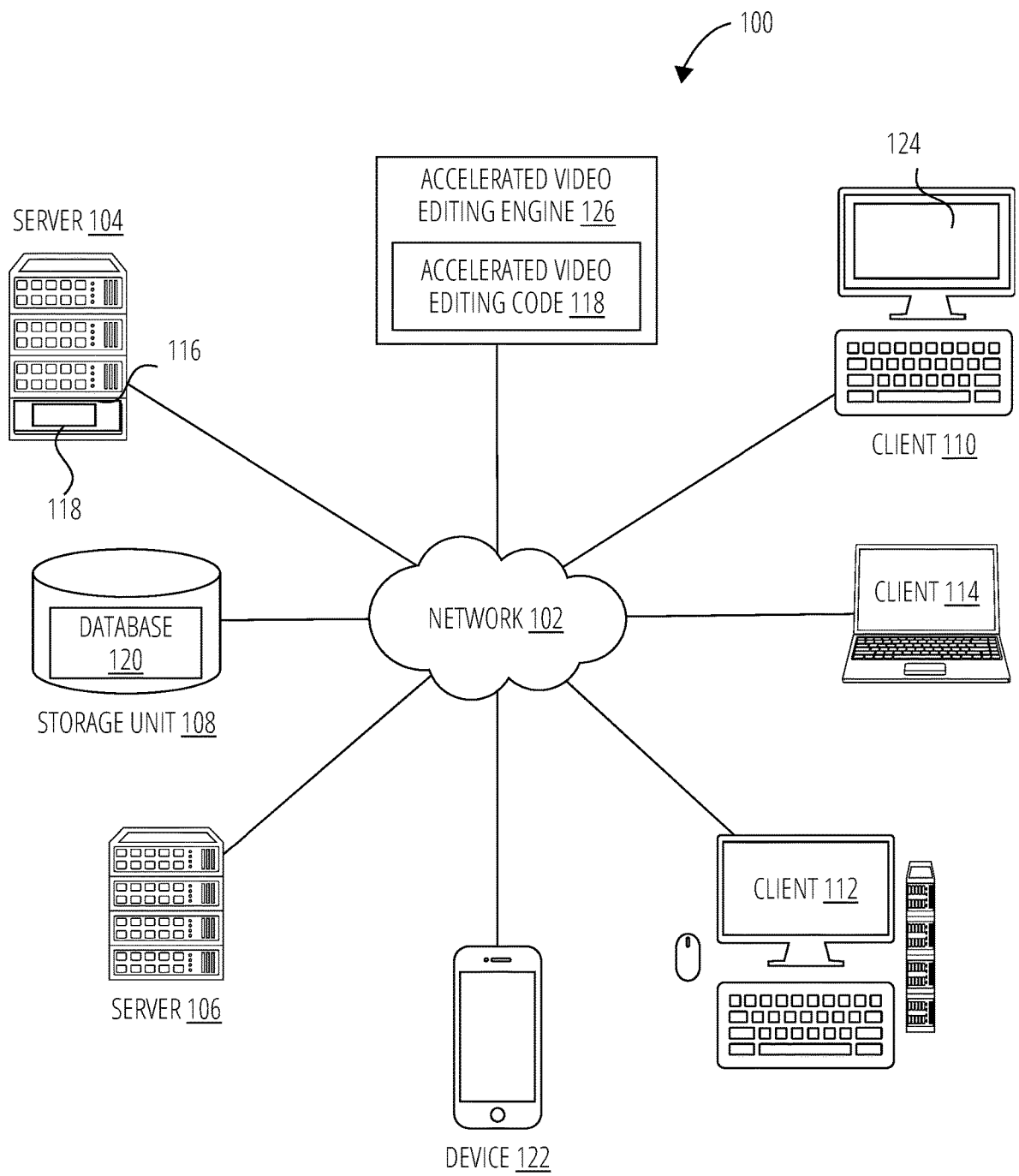
FIG. 1 depicts a block diagram of a network of data processing systems in accordance with an illustrative embodiment.

In the following detailed description, numerous specific details are set forth by way of examples in order to provide a thorough understanding of the relevant teachings. However, it should be apparent that the present teachings may be practiced without such details. In other instances, well-known methods, procedures, components, and/or circuitry have been described at a relatively high-level, without detail, in order to avoid unnecessarily obscuring aspects of the present teachings.

Video editing involves the manipulation and rearrangement of videos sections to produce a new version of a video. It may entail selecting and combining a plurality of graphics, audio clips, and video clips to generate a coherent narrative.

Film, television, advertising, and other forms of media creation frequently use video editing. In video editing, an edited or final video may usually clearly convey a message or elicit a desired reaction from a viewer. It is recognized that to generate a desired edited video, actions such as cutting out video sections, adding transitions or special effects, adding color, adjusting sound, and other actions may be undertaken. It is further recognized that manual video editing is significantly time consuming, involving repetitions of certain editing actions and effort from video editors. A video editor may review an entire input raw video, identify a plurality of sections thereof for editing, and manually process the sections. It is recognized that while for a lot of scenarios, the editing pattern is the same for the same type of video content, for example, one may speed up or cut the long waiting time of clips, hide or blur any confidential information with mosaic, etc., the edits may feature repetitive manual work, which is time intensive and inefficient.

The illustrative embodiments accelerate the video editing work by automatically processing the clips, via a profile script, that have the same pattern and/or are acted upon by the same type of editing actions.

In one aspect, the illustrative embodiments accelerate video editing by segmenting a video into a plurality of clips, and automatically computing for each clip of the plurality of clips, corresponding metadata that represent at least one attribute of the clip based on an analysis of contents of the clip. A user generates a profile script based on the corresponding metadata, the profile script is generated to include one or more editing actions to be performed on a section of the video, the section corresponding to at least one identified clip from the plurality of clips. The illustrative embodiments employ an editing tool that automatically edits the video through editing the raw video or editing and merging the edited clips based on information specified by the profile script to generate an edited video. In the case of editing the clips, new clips may be generated for each edited clip and the new clips may be merged together to produce the edited video, whereas in the case of editing the original video, sections of the original video corresponding to clips identified in the profile script may be detected and edited.

Certain operations are described as occurring at a certain component or location in an embodiment. Such locality of operations is not intended to be limiting on the illustrative embodiments. Any operation described herein as occurring at or performed by a particular component, can be implemented in such a manner that one component-specific function causes an operation to occur or be performed at another component, e.g., at a local or remote engine respectively. A method of an embodiment described herein, when implemented to execute on a device or data processing system, comprises substantial advancement of the functionality of that device or data processing system by enabling the use of a profile script which may be customized for a particular industry and in an easy to understand fashion to not only improve editing times but to also enhance editing quality, making video editing more efficient and making it easier to work with a diverse set of videos from different industries. Embodiments have the capacity to improve the technical field of video editing by providing a tool-adaptive and customizable video editing language with profile scripts, which may define video editing patterns for identified video clips and by automatic execution of video editing with user-defined profile scripts against identified video clips.

Importantly, although the operational/functional descriptions described herein may be understandable by the human mind, they are not abstract ideas of the operations/functions divorced from computational implementation of those operations/functions. Rather, the operations/functions represent a specification for an appropriately configured computing device. As discussed in detail below, the operational/functional language is to be read in its proper technological context, i.e., as concrete specifications for physical implementations.

It should be appreciated that aspects of the teachings herein are beyond the capability of a human mind. It should also be appreciated that the various embodiments of the subject disclosure described herein can include information and automations that are impossible to obtain manually by an entity, such as a human user. For example, the type, amount, and/or variety of information included in performing the process discussed herein can be more complex than information that could be reasonably be processed manually by a human user.

The illustrative embodiments are described with respect to certain types of data, functions, algorithms, equations, model configurations, locations of embodiments, additional data, devices, data processing systems, environments, components, and applications only as examples. Any specific manifestations of these and other similar artifacts are not intended to be limiting to the disclosure. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the disclosure, either locally at a data processing system or over a data network, within the scope of the disclosure.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the disclosure within the scope of the disclosure. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

With reference to the figures and in particular with reference to FIG. 1 these figures are example diagrams of data processing environments in which illustrative embodiments may be implemented. FIG. 1 is only an example and is not intended to assert or imply any limitation with regard to the environments in which different embodiments may be implemented. A particular implementation may make many modifications to the depicted environments based on the following description.

Data Processing Environment

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Client 110, client 112, client 114 are also coupled to network 102. A data processing system, such as clients (client 110, client 112, client 114), accelerated video editing engine 126, and device 122 may include data and may have software applications or software tools executing thereon.

Only as an example, and without implying any limitation to such architecture, FIG. 1 depicts certain components that are usable in an example implementation of an embodiment. For example, servers and clients are only examples and not to imply a limitation to a client-server architecture. As another example, an embodiment can be distributed across several data processing systems and a data network as shown, whereas another embodiment can be implemented on a single data processing system within the scope of the illustrative embodiments. Data processing systems (e.g., accelerated video editing engine 126, server 104, server 106, client 110, client 112, client 114, device 122) also represent example nodes in a cluster, partitions, and other configurations suitable for implementing an embodiment.

Server 104, server 106, storage unit 108, client 110, client 112, client 114, device 122, Accelerated video editing engine 126 may couple to network 102 using wired connections, wireless communication protocols, or other suitable data connectivity. Client 110, client 112, and client 114 may be, for example, personal computers or network computers.

In the depicted example, the servers may provide data, such as boot files, operating system images, and applications to client 110, client 112, and client 114. Client 110, client 112 and client 114 may be clients to servers in this example. Client 110, client 112 and client 114 or some combination thereof, may include their own data, boot files, operating system images, and applications. Data processing environment 100 may include additional servers, clients, and other devices that are not shown. Server 104 may include a server application 116 that may be configured to implement one or more of the functions described herein in accordance with one or more embodiments. Server application 116, client application 124 and/or accelerated video editing engine 126 may include accelerated video editing code 118 configured for accelerated video editing using profile scripts. In some embodiments, accelerated video editing engine 126 may be or form a part of a server or client described herein.

Device 122 is an example of a device described herein. For example, device 122 can take the form of a smartphone, a tablet computer, a laptop computer, client 110 in a stationary or a portable form, a wearable computing device, or any other suitable device. Any software application described as executing in another data processing system in FIG. 1 can be configured to execute in device 122 in a similar manner. Any data or information stored or produced in another data processing system in FIG. 1 can be configured to be stored or produced in device 122 in a similar manner. Database 120 of storage unit 108 may store one or more term data samples for computations herein.

The data processing environment 100 may also be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service-oriented architecture where interoperable software components distributed across a network may be packaged together as coherent business applications. Data processing environment 100 may also take the form of a cloud and employ a cloud computing model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 200 includes an example of an environment for the execution of at least some of the computer code involved in performing the inventive methods, such as accelerated video editing code 118. In addition to accelerated video editing code 118, computing environment 200 includes, for example, Computer 202, wide area network 228 (WAN), end user device 230 (EUD), remote server 232, public cloud 240, and private cloud 236. In this embodiment, Computer 202 includes processor set 204 (including processing circuitry 206 and cache 208), communication fabric 210, volatile memory 212, persistent storage 214 (including operating system 216 and accelerated video editing code 118, as identified above), peripheral device set 218 (including user interface (UI) device set 220, storage 222, and Internet of Things (IoT) sensor set 224), and network module 226. Remote server 232 includes remote database 234. Public cloud 240 includes gateway 238, cloud orchestration module 242, host physical machine set 246, virtual machine set 244, and container set 248.

Figure 2:
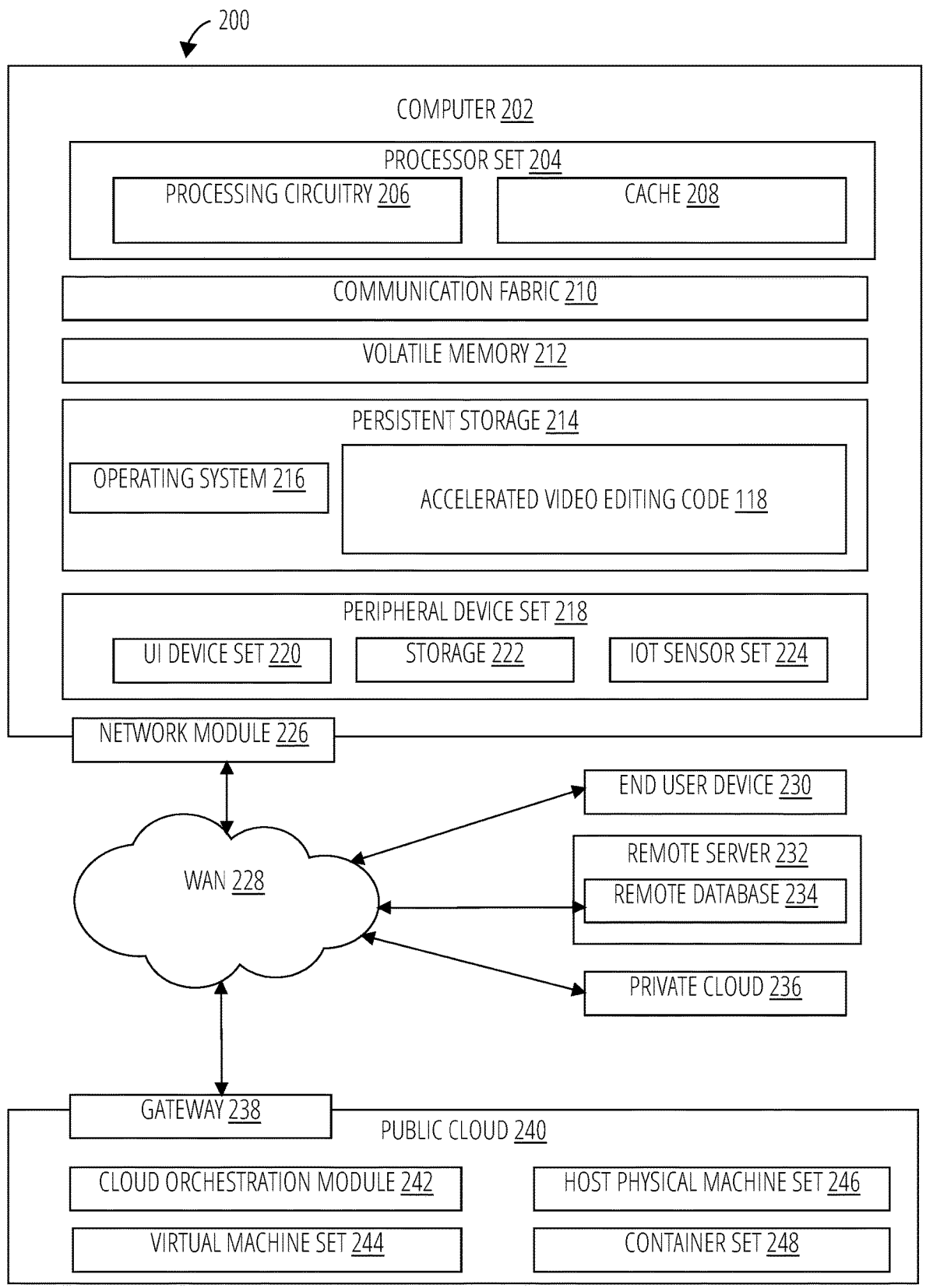
FIG. 2 depicts a block diagram of a computing environment in accordance with an illustrative embodiment.

Computer 202 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 234. As is well understood in the art of computer technology, and depending upon the technology, performance of a computer-implemented method may be distributed among multiple computers and/or between multiple locations. On the other hand, in this presentation of computing environment 200, detailed discussion is focused on a single computer, specifically Computer 202, to keep the presentation as simple as possible. Computer 202 may be located in a cloud, even though it is not shown in a cloud in FIG. 2. On the other hand, Computer 202 is not required to be in a cloud except to any extent as may be affirmatively indicated.

Processor set 204 includes one, or more, computer processors of any type now known or to be developed in the future. Processing circuitry 206 may be distributed over multiple packages, for example, multiple, coordinated integrated circuit chips. Processing circuitry 206 may implement multiple processor threads and/or multiple processor cores. Cache 208 is memory that is located in the processor chip package(s) and is typically used for data or code that should be available for rapid access by the threads or cores running on processor set 204. Cache memories are typically organized into multiple levels depending upon relative proximity to the processing circuitry. Alternatively, some, or all, of the cache for the processor set may be located "off chip." In some computing environments, processor set 204 may be designed for working with qubits and performing quantum computing.

Computer readable program instructions are typically loaded onto Computer 202 to cause a series of operational steps to be performed by processor set 204 of Computer 202 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 208 and the other storage media discussed below. The program instructions, and associated data, are accessed by processor set 204 to control and direct performance of the inventive methods. In computing environment 200, at least some of the instructions for performing the inventive methods may be stored in accelerated video editing code 118 in persistent storage 214.

Communication fabric 210 is the signal conduction path that allows the various components of Computer 202 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 212 is any type of volatile memory now known or to be developed in the future. Examples include dynamic type random access memory (RAM) or static type RAM. Typically, volatile memory 212 is characterized by random access, but this is not required unless affirmatively indicated. In Computer 202, the volatile memory 212 is located in a single package and is internal to Computer 202, but, alternatively or additionally, the volatile memory may be distributed over multiple packages and/or located externally with respect to Computer 202.

Persistent storage 214 is any form of non-volatile storage for computers that is now known or to be developed in the future. The non-volatility of this storage means that the stored data is maintained regardless of whether power is being supplied to Computer 202 and/or directly to persistent storage 214. Persistent storage 214 may be a read only memory (ROM), but typically at least a portion of the persistent storage allows writing of data, deletion of data and re-writing of data. Some familiar forms of persistent storage include magnetic disks and solid-state storage devices. Operating system 216 may take several forms, such as various known proprietary operating systems or open-source Portable Operating System Interface-type operating systems that employ a kernel. The code included in accelerated video editing code 118 typically includes at least some of the computer code involved in performing the inventive methods.

Peripheral device set 218 includes the set of peripheral devices of Computer 202. Data communication connections between the peripheral devices and the other components of Computer 202 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 220 may include components such as a display screen, speaker, microphone, wearable devices (such as goggles and smart watches), keyboard, mouse, printer, touchpad, game controllers, and haptic devices. Storage 222 is external storage, such as an external hard drive, or insertable storage, such as an SD card. Storage 222 may be persistent and/or volatile. In some embodiments, storage 222 may take the form of a quantum computing storage device for storing data in the form of qubits. In embodiments where Computer 202 is required to have a large amount of storage (for example, where Computer 202 locally stores and manages a large database) then this storage may be provided by peripheral storage devices designed for storing very large amounts of data, such as a storage area network (SAN) that is shared by multiple, geographically distributed computers. IoT sensor set 224 is made up of sensors that can be used in Internet of Things applications. For example, one sensor may be a thermometer and another sensor may be a motion detector.

Network module 226 is the collection of computer software, hardware, and firmware that allows Computer 202 to communicate with other computers through WAN 228. Network module 226 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 226 are performed on the same physical hardware device. In other embodiments (for example, embodiments that utilize software-defined networking (SDN)), the control functions and the forwarding functions of network module 226 are performed on physically separate devices, such that the control functions manage several different network hardware devices. Computer readable program instructions for performing the inventive methods can typically be downloaded to Computer 202 from an external computer or external storage device through a network adapter card or network interface included in network module 226.

WAN 228 is any wide area network (for example, the internet) capable of communicating computer data over non-local distances by any technology for communicating computer data, now known or to be developed in the future. In some embodiments, the WAN 228 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End User Device (EUD) 230 is any computer system that is used and controlled by an end user (for example, a customer of an enterprise that operates Computer 202) and may take any of the forms discussed above in connection with Computer 202. EUD 230 typically receives helpful and useful data from the operations of Computer 202. For example, in a hypothetical case where Computer 202 is designed to provide a recommendation to an end user, this recommendation would typically be communicated from network module 226 of Computer 202 through WAN 228 to EUD 230. In this way, EUD 230 can display, or otherwise present, the recommendation to an end user. In some embodiments, EUD 230 may be a client device, such as thin client, heavy client, mainframe computer, desktop computer and so on.

Remote server 232 is any computer system that serves at least some data and/or functionality to Computer 202. Remote server 232 may be controlled and used by the same entity that operates Computer 202. Remote server 232 represents the machine(s) that collect and store helpful and useful data for use by other computers, such as Computer 202. For example, in a hypothetical case where Computer 202 is designed and programmed to provide a recommendation based on historical data, then this historical data may be provided to Computer 202 from remote database 234 of remote server 232.

Public cloud 240 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 240 is performed by the computer hardware and/or software of cloud orchestration module 242. The computing resources provided by public cloud 240 are typically implemented by virtual computing environments that run on various computers making up the computers of host physical machine set 246, which is the universe of physical computers in and/or available to public cloud 240. The virtual computing environments (VCEs) typically take the form of virtual machines from virtual machine set 244 and/or containers from container set 248. It is understood that these VCEs may be stored as images and may be transferred among and between the various physical machine hosts, either as images or after instantiation of the VCE. Cloud orchestration module 242 manages the transfer and storage of images, deploys new instantiations of VCEs and manages active instantiations of VCE deployments. Gateway 238 is the collection of computer software, hardware, and firmware that allows public cloud 240 to communicate through WAN 228.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 236 is similar to public cloud 240, except that the computing resources are only available for use by a single enterprise. While private cloud 236 is depicted as being in communication with WAN 228, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 240 and private cloud 236 are both part of a larger hybrid cloud.

Figure 3:
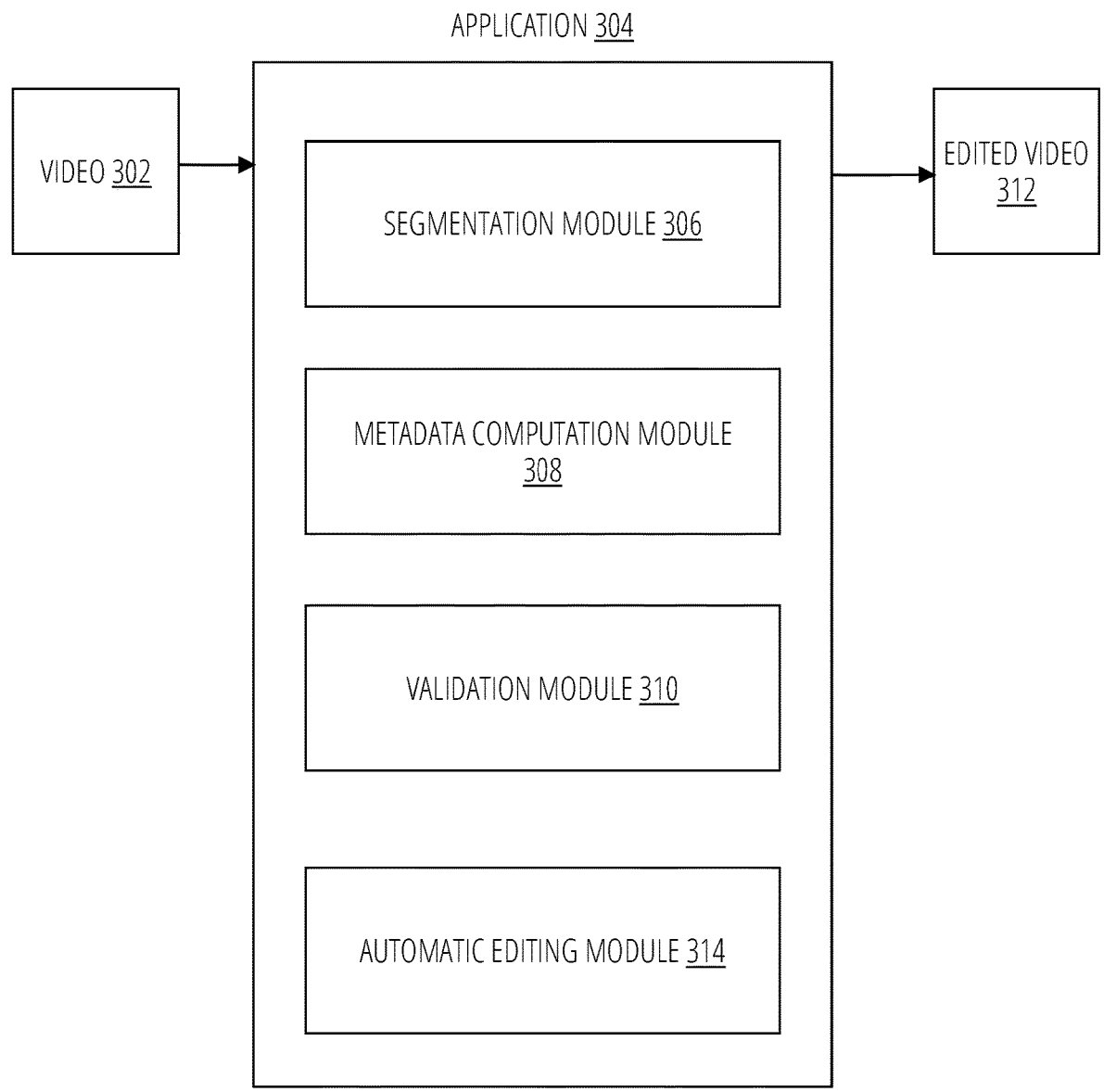
FIG. 3 depicts a block diagram of an application in accordance with an illustrative embodiment.

Turning now to FIG. 3, an application 304 for accelerated video editing is disclosed. The application 304 may be an example of the server application 116 or client application 124 of FIG. 1. The application may comprise a segmentation module 306 which may segment an input video 302, a metadata computation module 308, which may compute human understandable metadata (e.g., metadata in the form of words of a common language such, as the English language, that includes designated grammar and vocabulary), a validation module 310, which may validate a syntax of a profile script, and an automatic editing module 314, which may automatically edit the video 302 based on the profile script. The application 302 may perform some or all of the steps of routine 400 shown in FIG. 4 as discussed herein.

Figure 4:
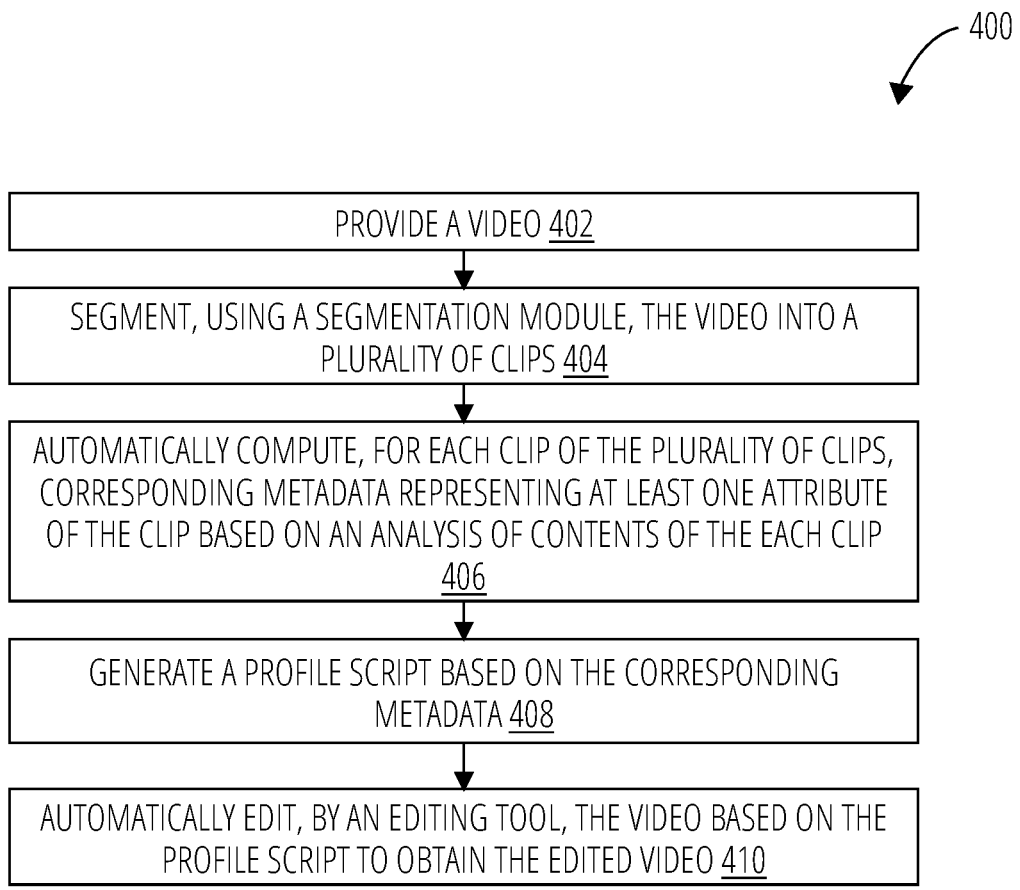
FIG. 4 depicts a flow chart of a routine in accordance with an illustrative embodiment.

FIG. 4 illustrates the routine 400 for accelerated video editing. The routine may be performed by the accelerated video editing engine 126 of FIG. 1. In block 402, the accelerated video editing engine 126 may receive the video 302 which may be a raw or original video designated for editing. In block 404, the accelerated video editing engine 126 may segment, using a segmentation module, the video into a plurality of clips. In block 406, the accelerated video editing engine 126 may automatically compute, for each clip of the plurality of clips, corresponding metadata that at least one attribute of the clip based on an analysis of contents of clip. In block 408, the accelerated video editing engine 126 may receive instructions from a user, such as manual customization instructions, to generate a profile script, discussed hereinafter, based on the corresponding metadata. The profile script may be customized to include one or more editing actions to be performed on at least one section of the video 302 corresponding to at least one identified clip of the plurality of clips. In block 410, the accelerated video editing engine 126 may automatically edit, by an editing tool, the original video or clips based on the profile script to obtain the edited video 312.

Figure 5:
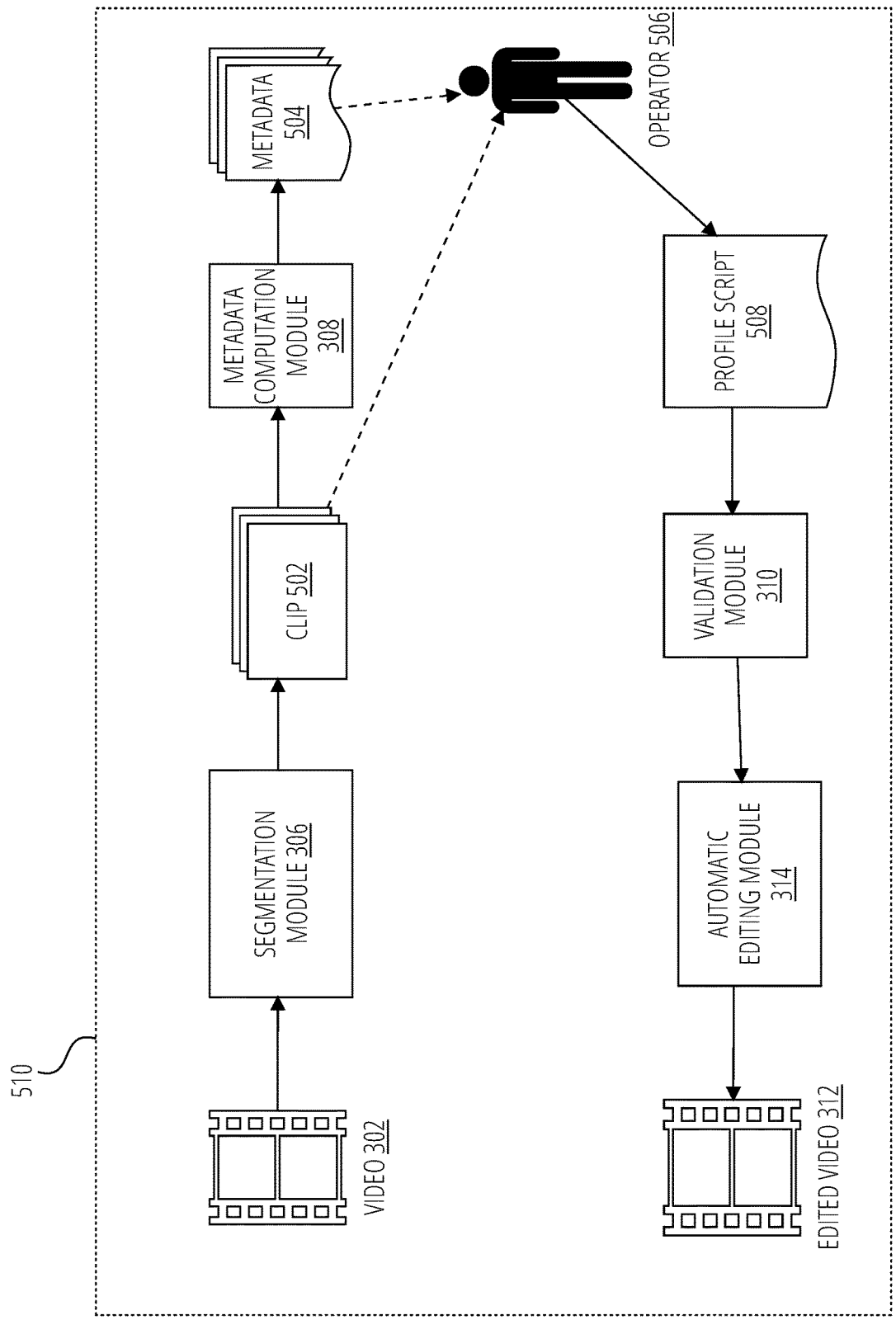
FIG. 5 depicts a block diagram of a system for accelerating video editing in accordance with an illustrative embodiment.

In FIG. 5, the application 304 and routine 400 of FIG. 3 and FIG. 4 are explained in more detail. FIG. 5 illustrates a system 510 for accelerating video editing in accordance with an illustrative embodiment. The system may be operable to reduce repeated manual video editing, such as deleting similar patterns of redundant video clips from the original videos. The system may enable an operator (e.g., a video editor) to complete video editing more efficiently, alleviating repeated playing of original videos to locate video clips correctly.

Upon receiving the video 302, the segmentation module 306 may split the video into several clips based on one or more segmentation parameters such as object identification in image frame, text sentiment and audio wave. More specifically, the segmentation module 306 may segment the video based on an object identification event wherein one or more objects or images detected in the video may be used as a parameter for producing at least one of the plurality of clips 502. The segmentation module 306 may also segment the video based on an audio identification event wherein, for example, one or more distinct sections of an audio of the video 302 is used as a basis for producing at least one of the plurality of clips 502. Even further, the segmentation module 306 may segment the video 302 based on a text identification event wherein, for example, one or more texts of the video is used as a parameter for producing at least one of the plurality of clips 502. Of course, on or more of these parameters and other segmentation parameters may be used for segmentation and the segmentation module need not be confined to all of them.

Upon obtaining the plurality of clips 502, one or more of the clips 502 or each of the clips 502 may be analyzed by the metadata computation module 308 to compute operator understandable metadata 504 for the clips. The operator or human understandable metadata 504 may each comprise a key-value data structure, for example {"type": "loading", "sound": "blank"}, that represents the at least one attribute of the clip. More specifically, the metadata 504 may be structured to be human friendly and depict attributes that are easily understood by a human operator. In one or more embodiments, the attributes of interest may be designated based on predetermined operator needs or industry specific customizations. For example, in one industry, the operator may be in a medical setting and an attribute of interest may comprise, for example, whether the clip is blank, includes images of blood, or includes the sound of medical devices being operated. In another industry such as in an educational setting, an attribute of interest may include, for example, whether the clip includes one or more texts. The metadata 504 of each clip 502 may include one or more key value pairs and need not be limited to just one key-value pair. Further, each key-value pair may be predetermined to be easily understandable. A set of program instructions defining how one or more attributes are identified in the clips 502 may be used by the metadata computation module 308 for metadata computation. The set of program instructions may rely on several dimensions of data to accurately identify attributes of the clip. The set of program instructions may further be different from the instructions used by the segmentation module for segmentation. However, in some embodiments, the set of program instructions may be similar to or based on program instructions used by the segmentation module for segmentation.

It is recognized that making the metadata 504 human friendly may make the customization of the profile script 508 simple and efficient as discussed herein. The operator 506 may review the plurality of clips 502 and generate a profile script 508 (an example shown in FIG. 6) based on the plurality of clips. The profile script 508 may be manually generated and customized by the operator 506. However, the profile script 508 may alternatively be automatically generated responsive to which the profile script 508 is manually customized by the operator 506 according to the operator's editing needs.

A profile script 508 may comprise one or more of an editing action 602, a clip identification 604, an option 606 such as an attribute option, an option value 608 such as the value of an attribute option, an editing action 602, and a clip text 610. Examples of editing actions 602 may be a cutting action, a compression action, a masking action of a text, image or audio, an appending action, a replacement action or otherwise other editing actions. Examples of clip identifications 604 may be a term identifying a clip (e.g., "clip_2") or a term identifying plurality of clips (e.g., the asterisk symbol "*" which may identify all clips that meet a specified criteria). Examples of options 606 may include "type" or "clip type", "sound", etc., with corresponding option values 608 being, for example "loading" (e.g., signifying that the clip includes non-changing images) and "blank" (signifying that the clip sound is blank). Clip texts 610 may represent, for example, texts designated to be identified in clips 502. Of course, these are just examples and other examples and compositions or syntax of the profile script 508 may be possible in view of the descriptions herein. Ultimately, since the clips 502 may have associated human understandable metadata 504 in the form of key-value pairs, the profile script may be easily customized by the operator 506 as a set of editing instructions for use in automatically identifying individual clips for editing actions or more specifically for identifying sections of the video corresponding to the individual clips and modifying the video to obtain an edited video.

More specifically, responsive to customizing the profile script 508, the syntax of the profile script 508 may be validated by the validation module 310 as shown in FIG. 5 and upon passing the validation, the automatic editing module 314 may automatically edit the video 302, such as by directly editing the original video or editing and merging the plurality of clips 502, based on instructions of the profile script 508 to generate the edited video 312.

Figure 7:
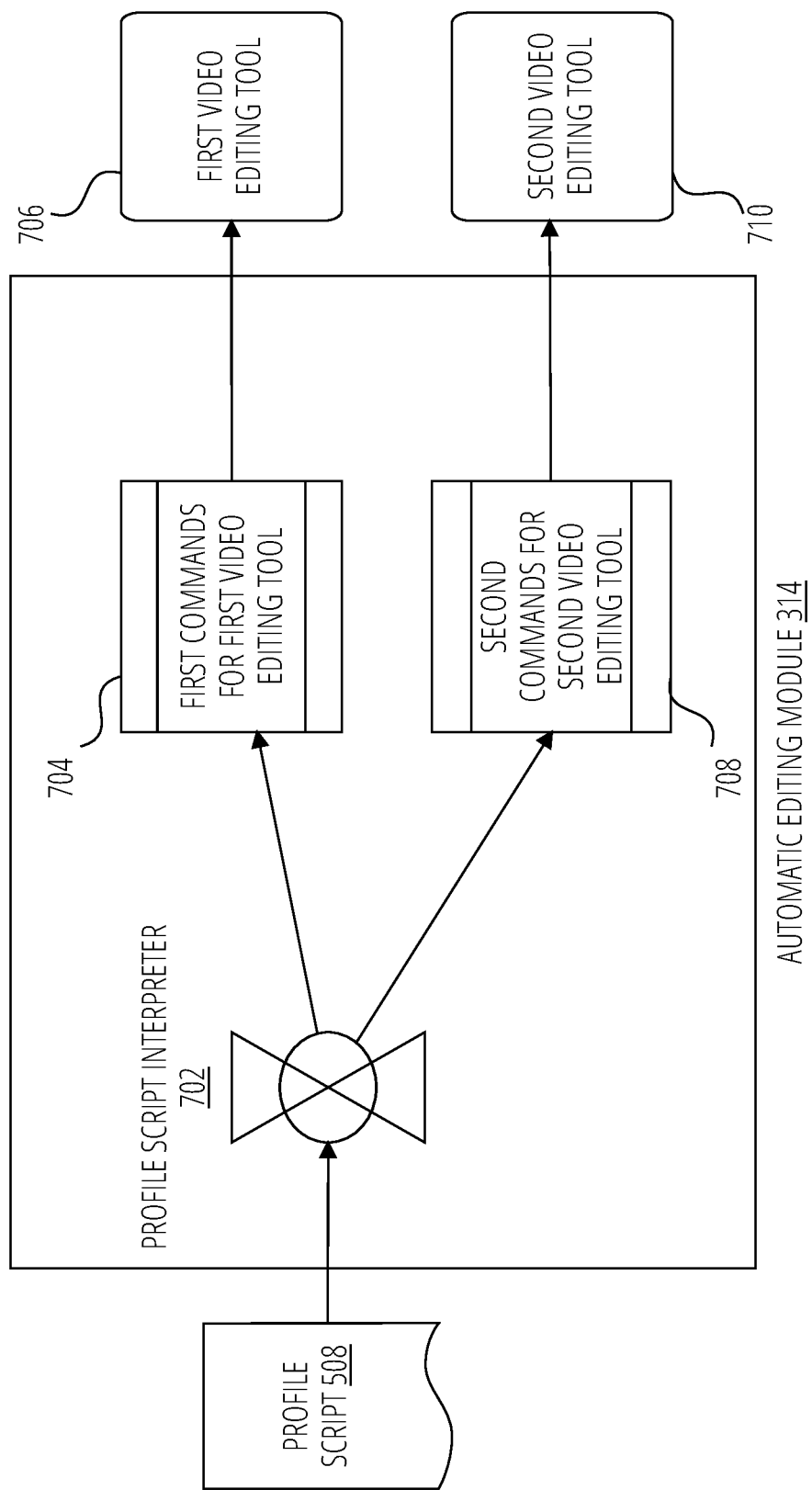
FIG. 7 depicts a block diagram of an automatic editing module in accordance with an illustrative embodiment.

The automatic editing module 314 may comprise a profile script interpreter 702 and commands, such as machine code, for a video editing tool (see FIG. 7). By use of the profile script interpreter 702, the automatic editing module 314 may transform the profile script 508, into a plurality of tool-dependent commands (for example, first commands for first video editing tool 704 A and/or second commands for second video editing tool 708 that are usable by the first video editing tool 706 and/or second video editing tool 710 respectively). The profile script interpreter 702 may thus be a transformer engine configured for tool dependent command generation which commands may be used by the editing tool to automatically edit the video. In one specific example, the input of profile script interpreter is the profile script 508. The output is the command sequence based on different editing tools. One video editing tool may then perform the command sequence on respective clips identified by the profile script and generate a new video clip for each respective clip. Once all the respective clips are processed, the video editing tool may merge the new clips into a new video. Alternatively, the video editing tool may perform the command sequence on sections of the original video corresponding to the respective clips identified by the profile script to produce a final edited video. Other technical features may be readily apparent to one skilled in the art from the figures, descriptions, and claims herein.

CONCLUSION

The descriptions of the various embodiments of the present teachings have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the foregoing has described what are considered to be the best state and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

The components, steps, features, objects, benefits and advantages that have been discussed herein are merely illustrative. None of them, nor the discussions relating to them, are intended to limit the scope of protection. While various advantages have been discussed herein, it will be understood that not all embodiments necessarily include all advantages. Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Numerous other embodiments are also contemplated. These include embodiments that have fewer, additional, and/or different components, steps, features, objects, benefits and advantages. These also include embodiments in which the components and/or steps are arranged and/or ordered differently.

Aspects of the present disclosure are described herein with reference to a flowchart illustration and/or block diagram of a method, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures herein illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing has been described in conjunction with exemplary embodiments, it is understood that the term "exemplary" is merely meant as an example, rather than the best or optimal. Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments have more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A computer implemented method for accelerated video editing, comprising:
   receiving a video;
   segmenting the video into a plurality of clips based on one or more segmentation parameters;
   automatically computing, for each clip of the plurality of clips, corresponding metadata representing at least one clip attribute based on an analysis of contents of each clip of the plurality of clips;
   generating a profile script based on the corresponding metadata, the profile script being generated to include one or more editing actions to be performed on the video or the plurality of clips; and
   automatically editing, by an editing tool, the video or the clips based on the profile script to obtain an edited video.

2. The method of claim 1, wherein the corresponding metadata is generated in human understandable language.

3. The method of claim 1, further comprising transforming the profile script, by a profile script interpreter, into a plurality of tool-dependent commands usable by the editing tool prior to automatically editing the video by the editing tool.

4. The method of claim 1, wherein the segmenting is based on at least object identification, wherein one or more objects detected in the video are used as a parameter for producing one of the plurality of clips.

5. The method of claim 1, wherein the segmenting is based on at least audio identification, wherein one or more distinct sections of an audio of the video are used as a parameter for producing one of the plurality of clips.

6. The method of claim 1, wherein the segmenting is based on at least text identification, wherein one or more texts of the video is used as a parameter for producing one of the plurality of clips.

7. The method of claim 1, wherein the corresponding metadata comprises a key-value data structure that represents the at least one attribute of each clip of the plurality of clips.

8. The method of claim 7, wherein at least one of the plurality of clips is identified using the key-value data structure.

9. The method of claim 1, wherein generating the profile script comprises receiving a manually customized profile script in response to initially automatically generating the profile script.

10. The method of claim 1, wherein generating the profile script comprises receiving a manually generated and customized profile script from an operator.

11. The method of claim 1, wherein automatically editing comprises at least one of a cutting action, a compression action, a masking action of a text, image or audio, an appending action, or a replacement action.

12. The method of claim 1, further comprising validating a syntax of the profile script prior to automatically editing the video by the computing device.

13. A computer program product comprising:
   one or more computer-readable storage devices and program instructions stored on at least one of the one or more tangible storage devices, the program instructions executable by a processor, the program instructions comprising:
   program instructions to receive a video;
   program instructions to segment the video into a plurality of clips based on one more segmentation parameters;
   program instructions to automatically compute, for each clip of the plurality of clips, corresponding metadata representing at least one attribute of the clip based on an analysis of contents of each clip of the plurality of clips;
   program instructions to generate a profile script based on the corresponding metadata, the profile script being generated to include one or more editing actions to be performed on the video; and
   program instructions to automatically edit, by an editing tool, the video based on the profile script to obtain an edited video.

14. The computer program product of claim 13, further comprising program instructions to generate the corresponding metadata in human understandable language.

15. The computer program product of claim 13, further comprising program instructions to transform the profile script into a plurality of tool-dependent commands usable by the editing tool prior to automatically editing the video by the editing tool.

16. The computer program product of claim 13, wherein the automatically editing comprises at least one of a cutting action, a compression action, a masking action of a text, image or audio, an appending action, or a replacement action.

17. A non-transitory computer-readable storage medium tangibly embodying a computer readable program code having computer readable instructions that, when executed, causes a processor to carry out a method comprising:
    receiving a video;
    segmenting the video into a plurality of clips based on one or more segmentation parameters;
    automatically computing, for each clip of the plurality of clips, corresponding metadata representing at least one attribute of the clip based on an analysis of contents of each clip of the plurality of clips;
    generating a profile script based on the corresponding metadata, the profile script being generated to include one or more editing actions to be performed the video; and
    automatically editing, the video based on the profile script to obtain an edited video.

18. The non-transitory computer-readable storage medium of claim 17, wherein the corresponding metadata is generated in human understandable language.

19. The non-transitory computer-readable storage medium of claim 17, wherein the method further comprises transforming the profile script, by a computerized profile script interpreter, into a plurality of tool-dependent commands usable by the editing tool prior to automatically editing the video by the editing tool.

20. The non-transitory computer-readable storage medium of claim 17, wherein the automatically editing includes at least one of a cutting action, a compression action, a masking action of a text, image or audio, an appending action, and a replacement action.

* * * * *